Feb. 17, 1970  M. A. SCHWEIKER ET AL  3,495,569
TILE TREATING MACHINE
Filed June 23, 1966  12 Sheets-Sheet 2
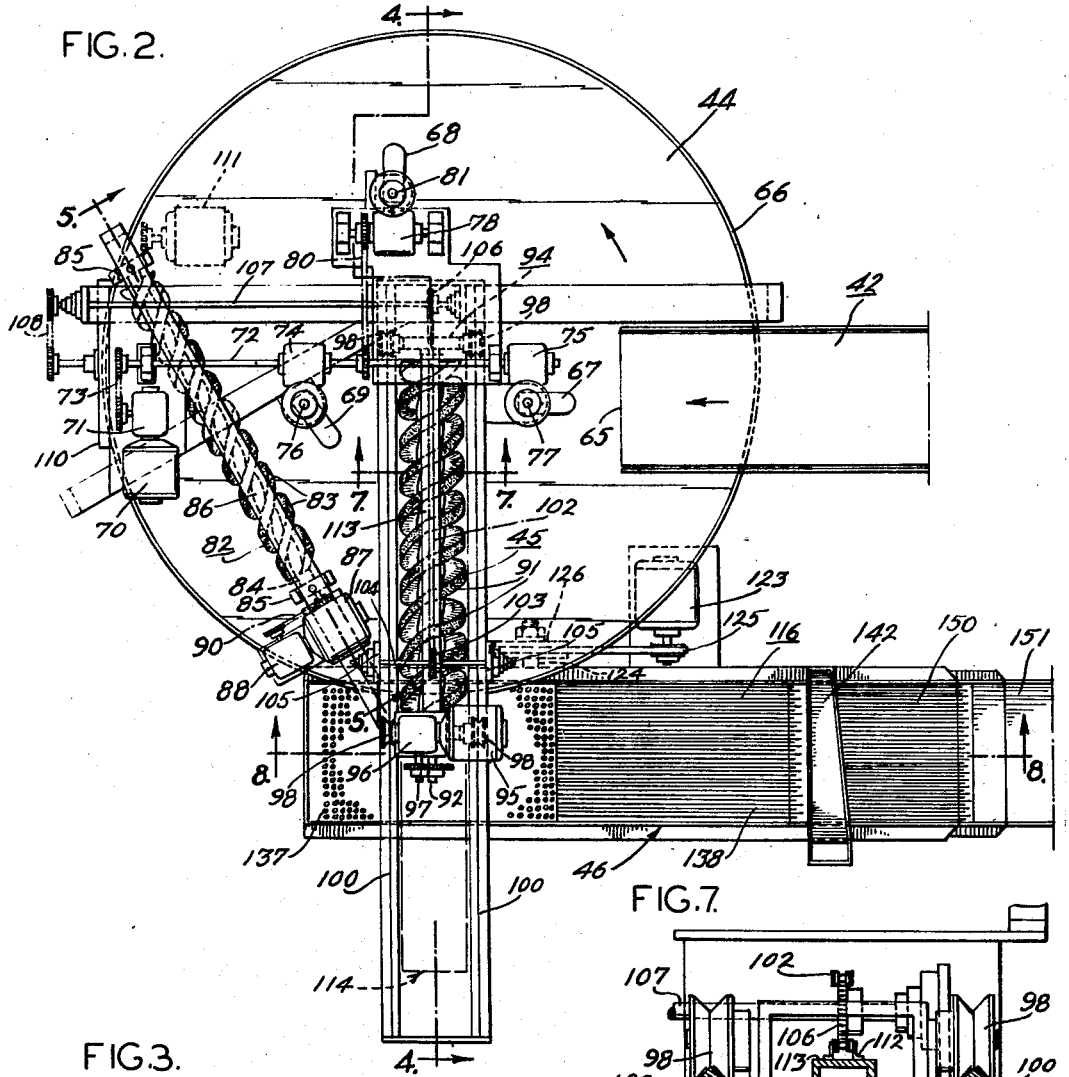
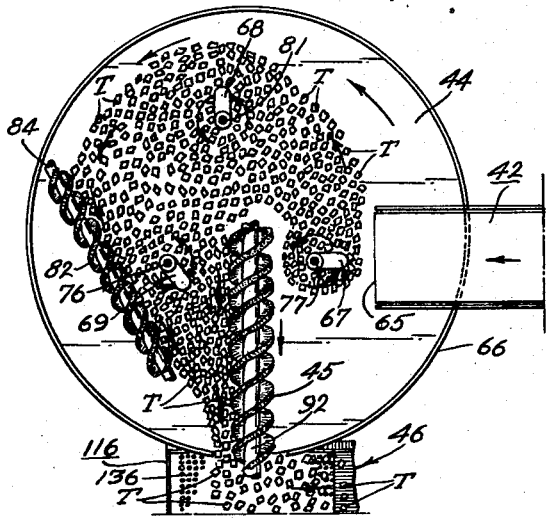
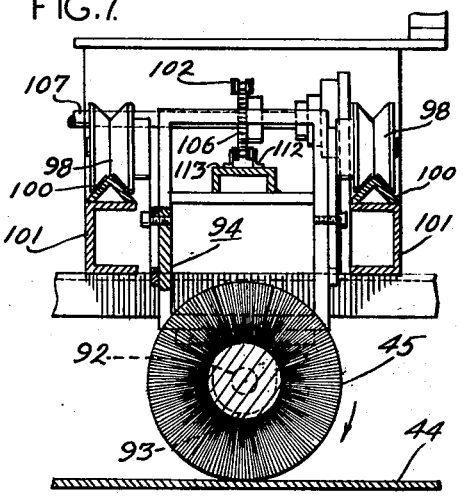
INVENTORS:
MALCOLM A. SCHWEIKER
WAYNE C. WATSON
BY Howdon & Howdon
ATTYS.

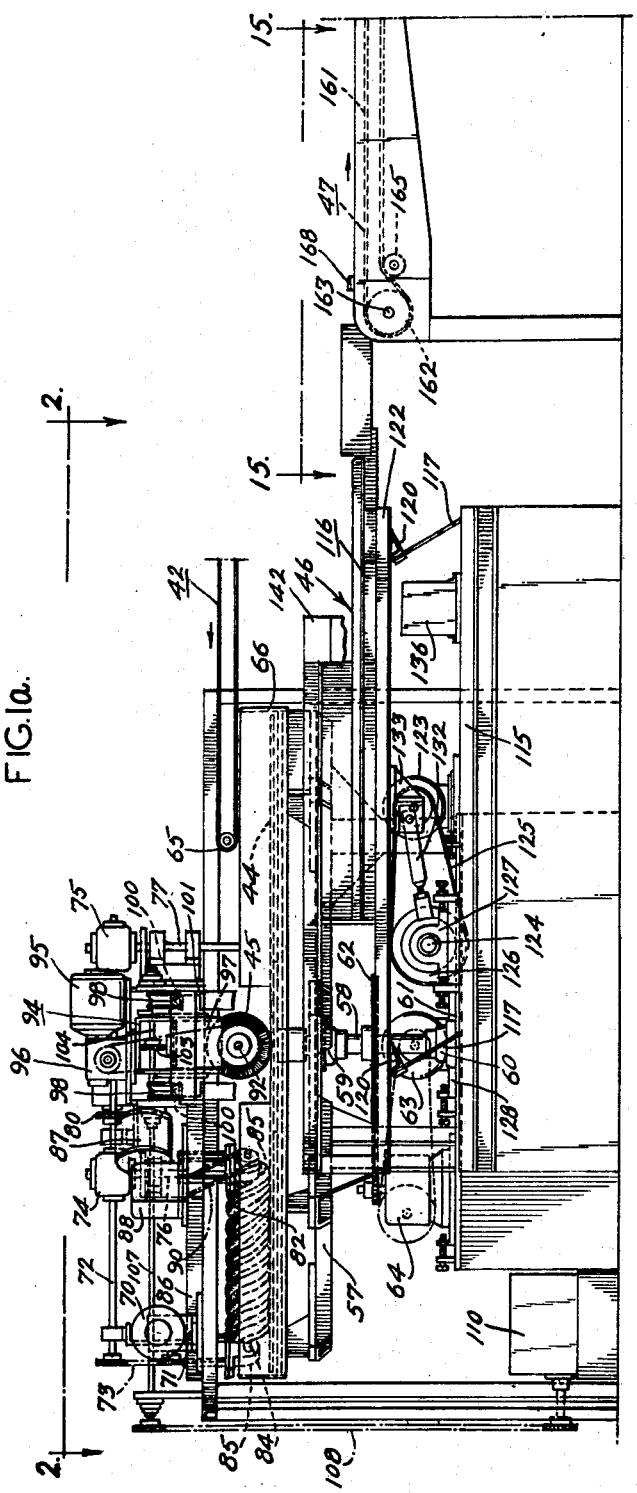

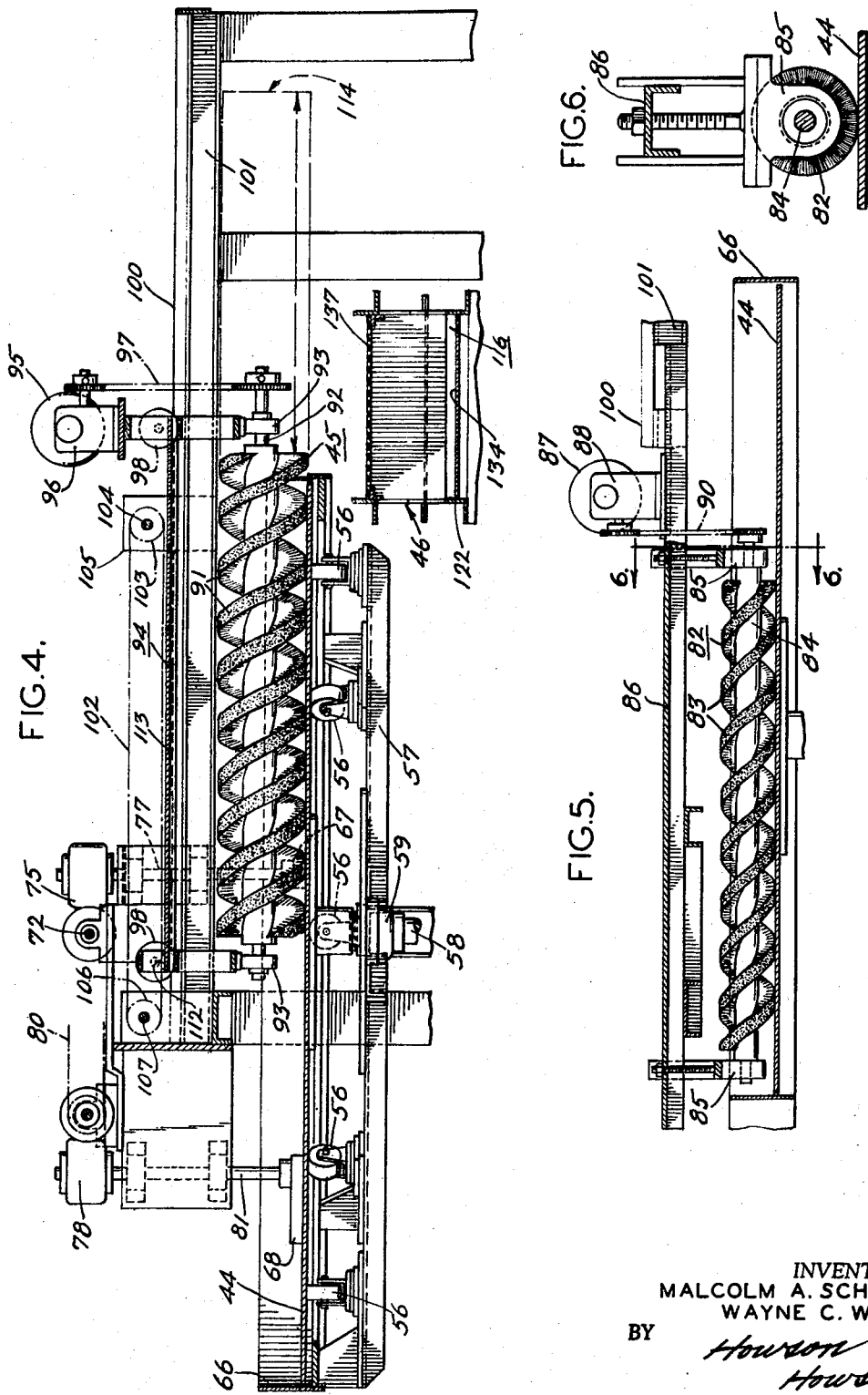

Feb. 17, 1970    M. A. SCHWEIKER ETAL    3,495,569
TILE TREATING MACHINE
Filed June 23, 1966    12 Sheets-Sheet 4
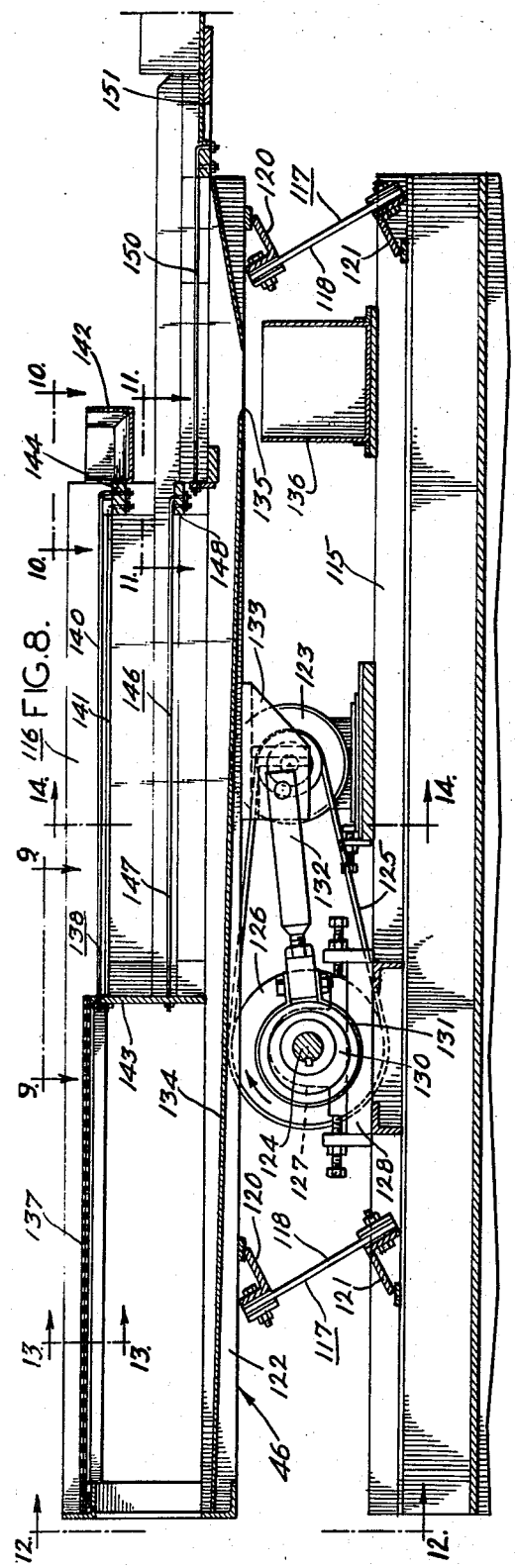
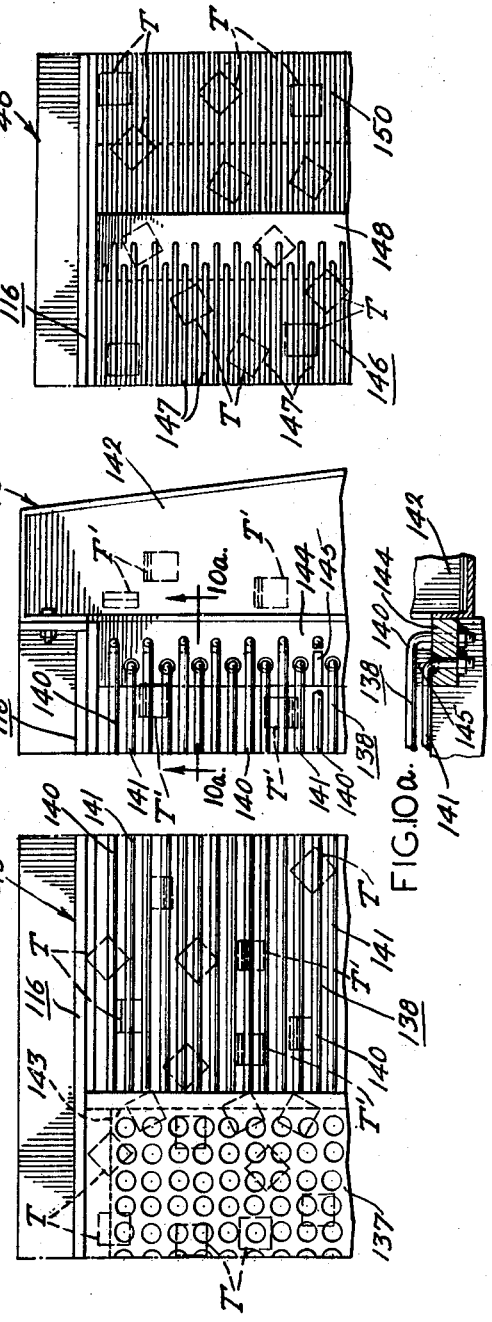
INVENTORS:
MALCOLM A. SCHWEIKER
WAYNE C. WATSON
BY
Howson & Howson
ATTYS.

Feb. 17, 1970   M. A. SCHWEIKER ET AL   3,495,569
TILE TREATING MACHINE
Filed June 23, 1966   12 Sheets-Sheet 5

INVENTORS:
MALCOLM A. SCHWEIKER
WAYNE C. WATSON
BY Howson & Howson
ATTYS.

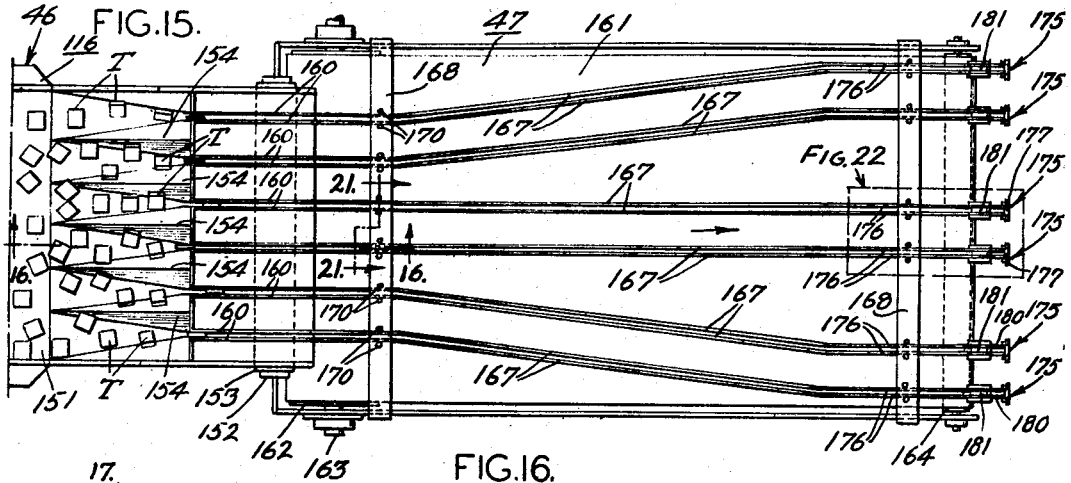

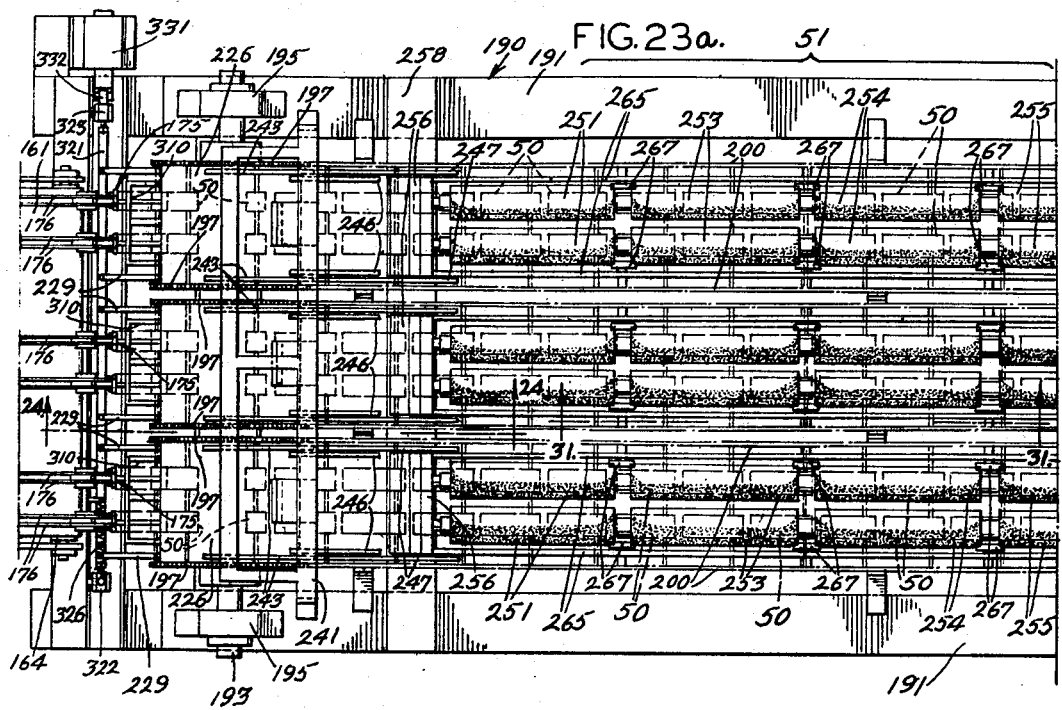
FIG. 23a.
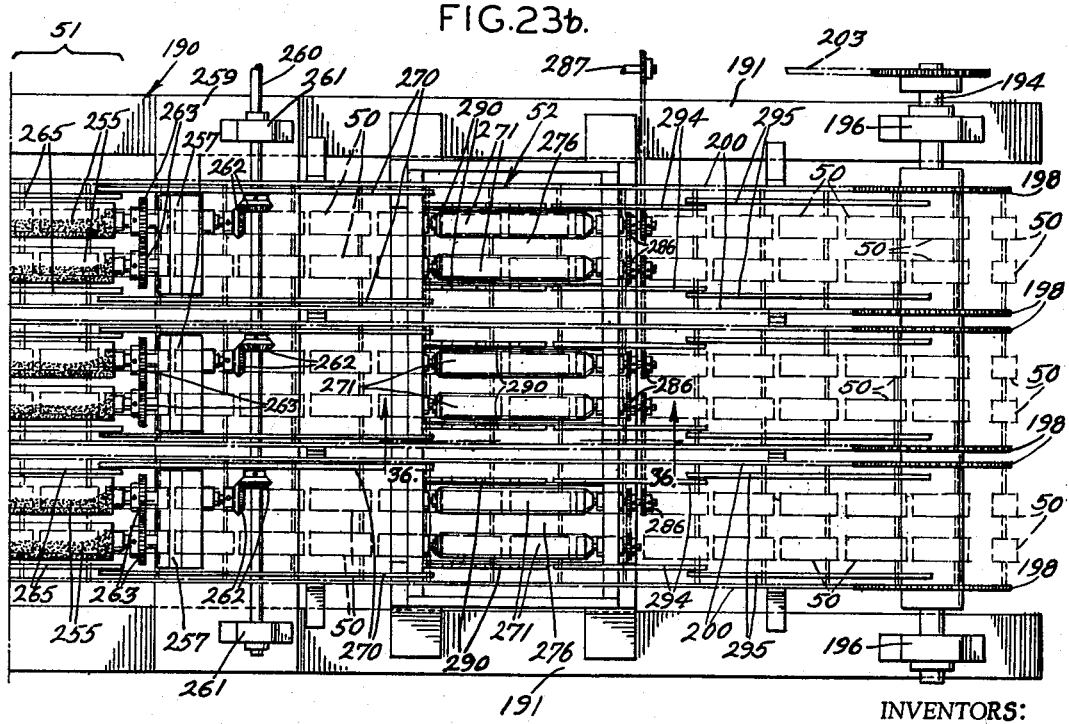

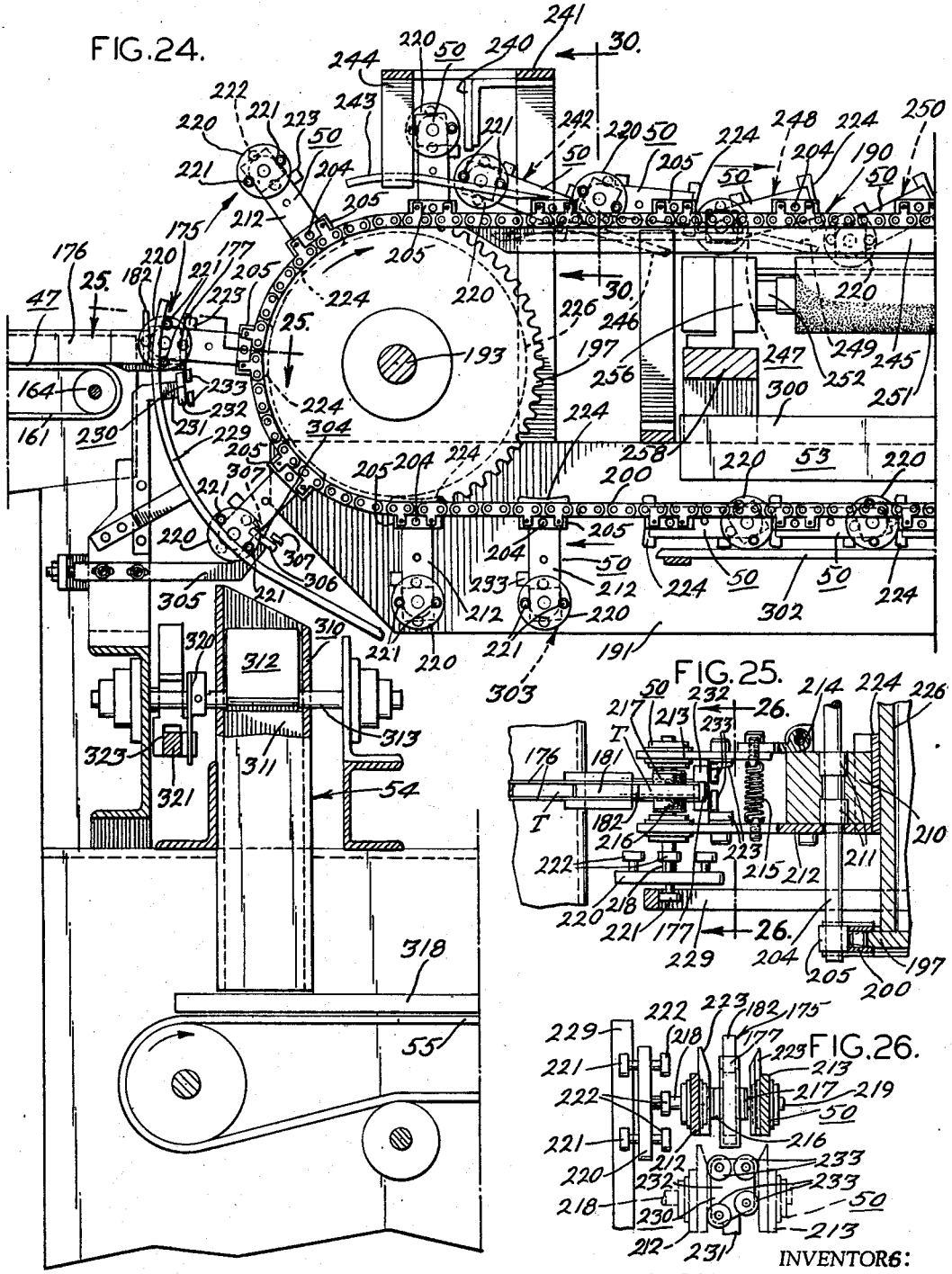

Feb. 17, 1970  M. A. SCHWEIKER ET AL  3,495,569
TILE TREATING MACHINE
Filed June 23, 1966  12 Sheets-Sheet 9
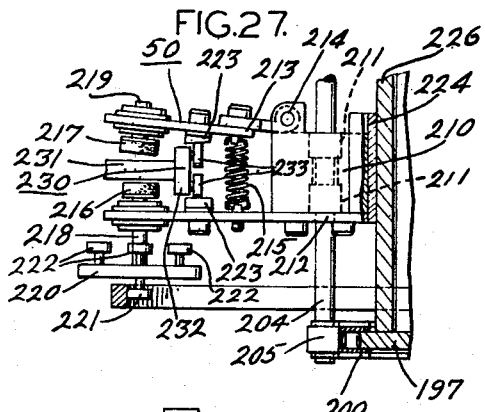
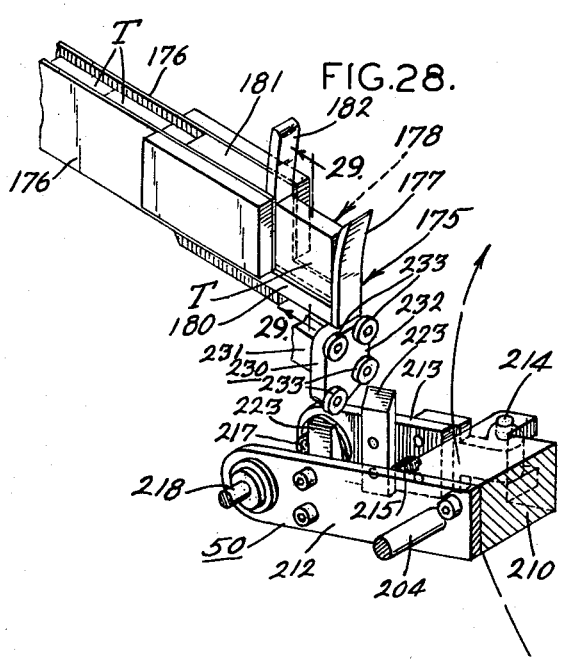
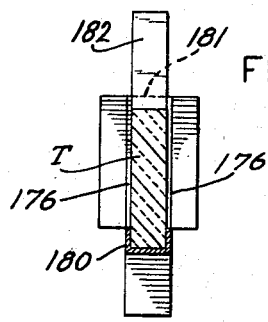
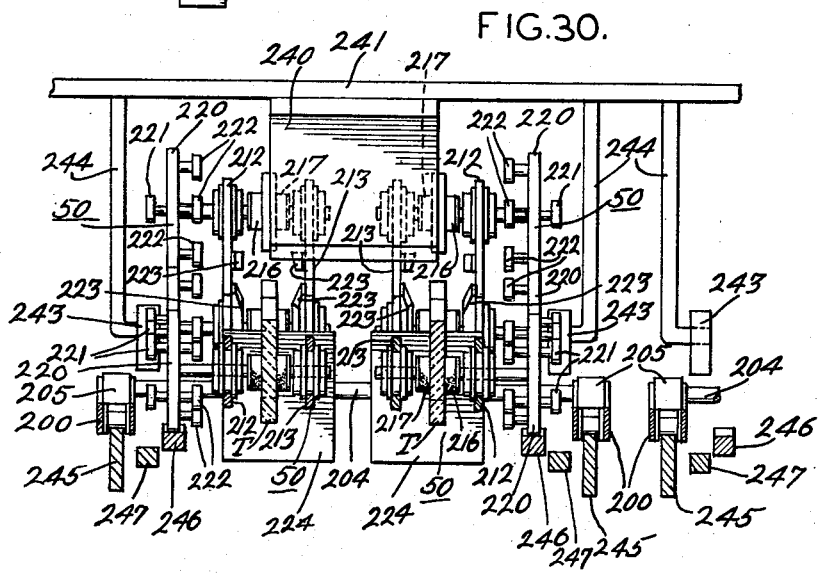
INVENTORS:
MALCOLM A. SCHWEIKER
WAYNE C. WATSON
BY Howson & Howson
ATTYS.

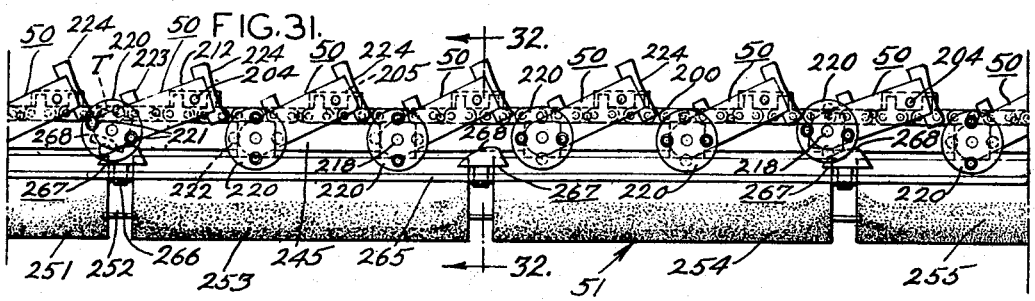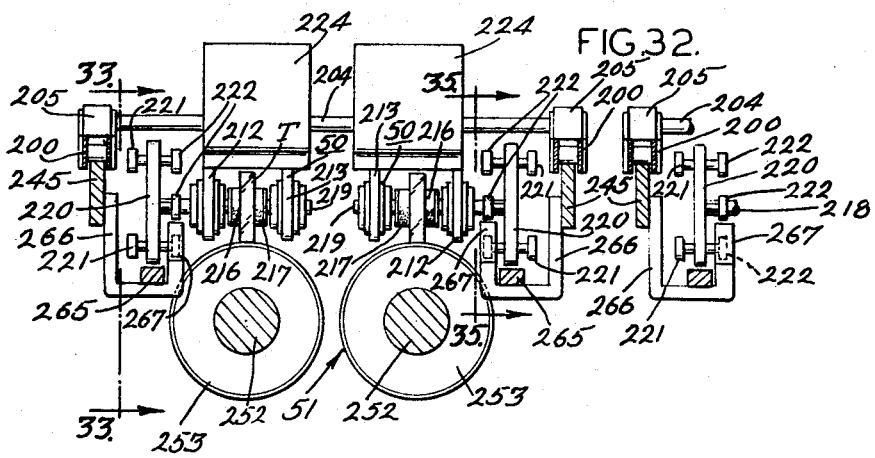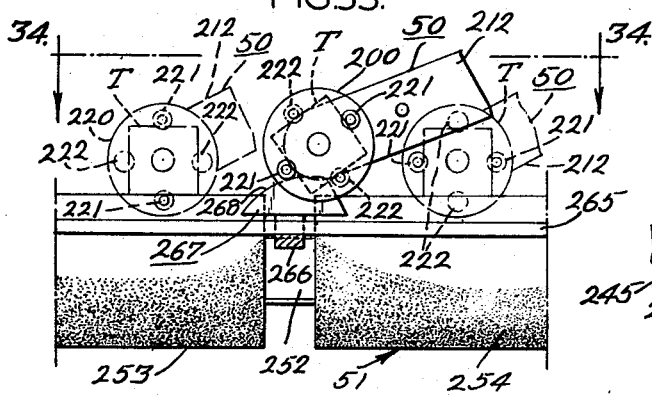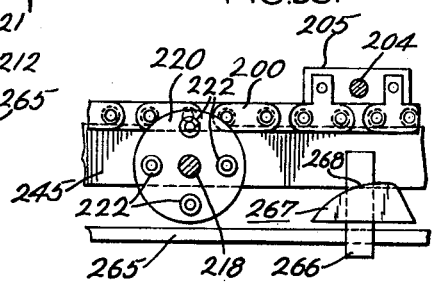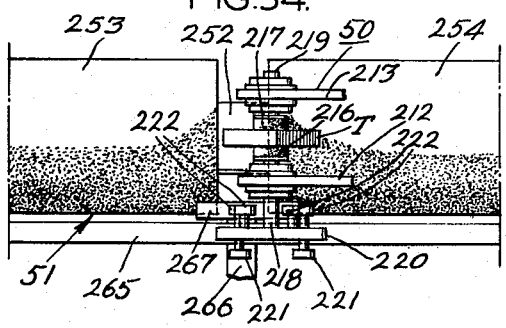

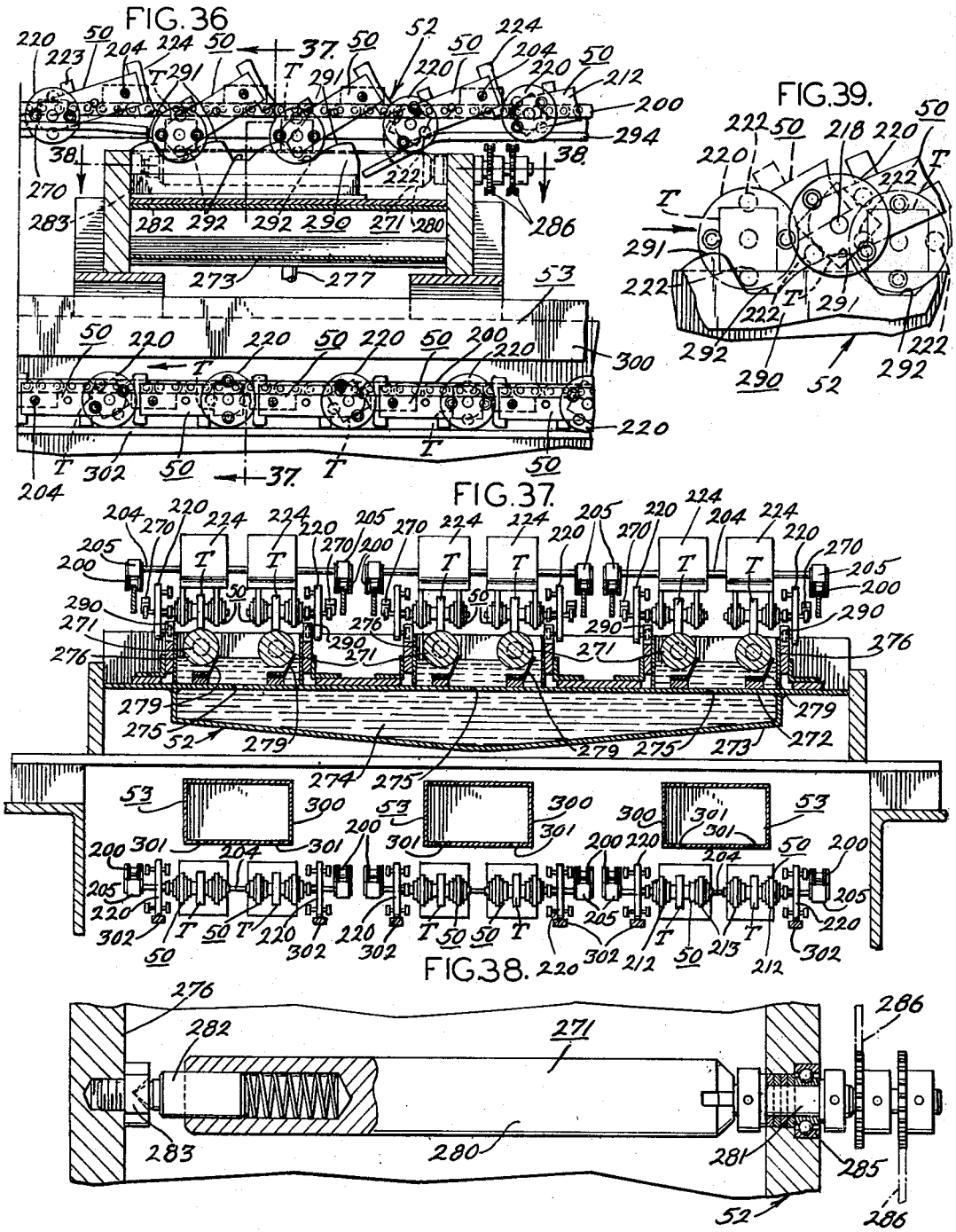

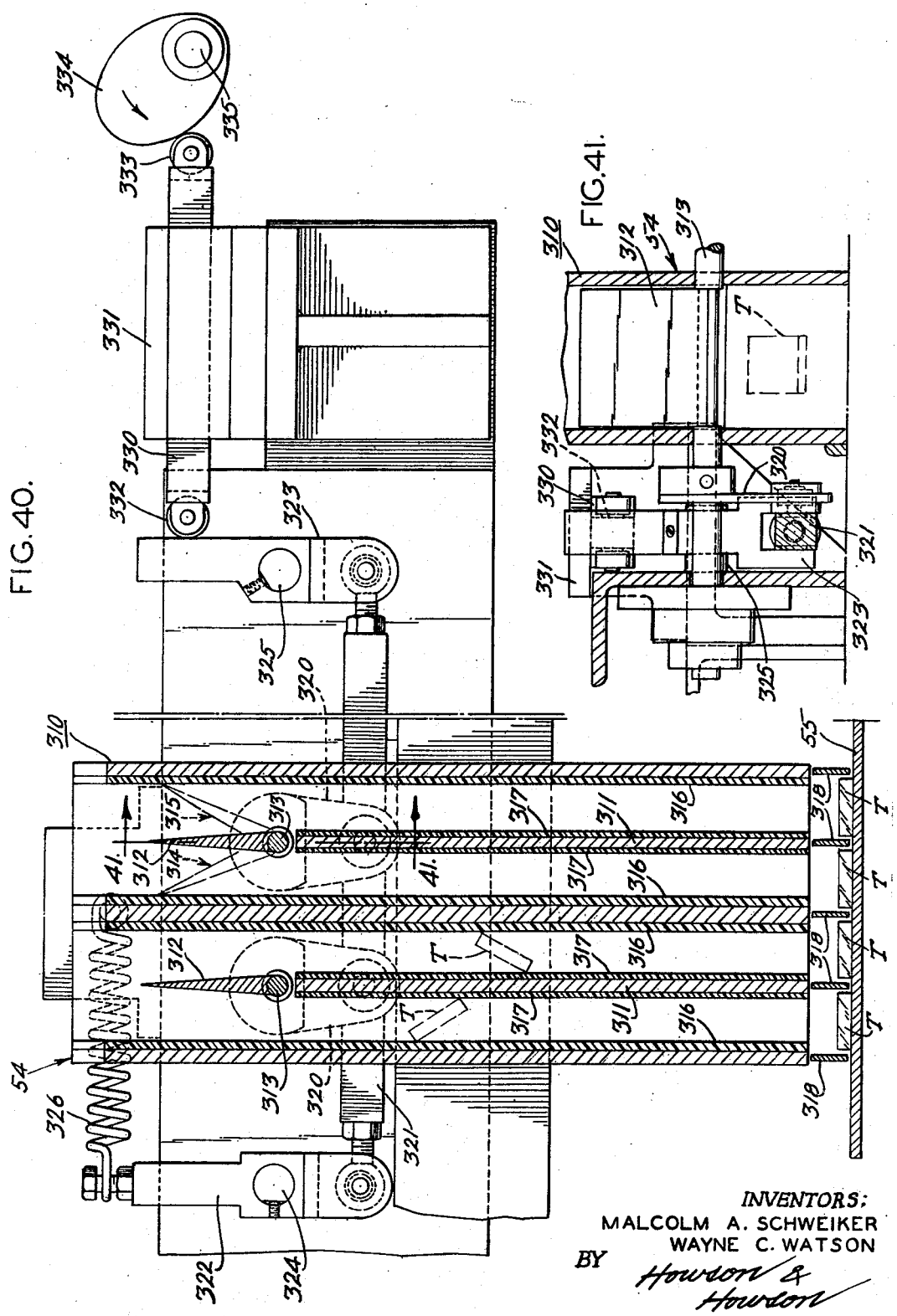

United States Patent Office 3,495,569
Patented Feb. 17, 1970

1

3,495,569
TILE TREATING MACHINE
Malcolm A. Schweiker, Worcester, and Wayne C. Watson, Ambler, Pa., assignors to American Olean Tile Company, Inc., Lansdale, Pa., a corporation of New York
Filed June 23, 1966, Ser. No. 559,943
Int. Cl. B05c 3/08
U.S. Cl. 118—72      9 Claims

ABSTRACT OF THE DISCLOSURE

A tile treating machine for automatically removing residual sand particles from the edges of ceramic tile elements, applying a primer to the tile edges and curing the applied primer. The tile edges are successively applied to a plurality of grinding wheels and a primer applicator roll and are then subjected to a hot air flow to cure the applied primer.

---

The present invention relates generally to apparatus for treating ceramic mosaic tiles and relates more particularly to apparatus for automatically removing residual grains of sand from the edges of unglazed ceramic tile elements and for applying a primer to the tile edges. The apparatus of the invention further includes means for blending tiles into a random assortment, means for separating double tiles and foreign matter from the assortment, and means for distributing the treated tiles into a plurality of rows for transfer to a tile assembly station.

Unglazed ceramic mosaic tile elements, which are most commonly made in the one inch square size for use in flooring and similar applications, due to their relatively small size, are normally fired while disposed on edge in a bed of sand, the sand serving to prevent shrinkage of the tiles by providing an even distribution of heat to the tiles. Because of the edgewise disposition of the tiles in the sand, grains of sand become bonded to the tile edges during firing of the tiles. The adhering sand grains have heretofore not been removed from the tiles in the formation of tile assemblies since the type of grouting conventionally applied between the tile elements following the setting thereof in cement adheres to and securely bonds the tile edges despite the presence of the sand particles.

However, with the recently developed pre-grouted tile assemblies of the type disclosed in the co-pending application Ser. No. 529,369, and now abandoned, assigned with the present application to a common assignee, wherein an elastomeric bonding material is applied between the tiles upon formation of the tile assembly, the residual sand particles become a problem. The elastomeric grouting will not adhere to the tile surfaces unless a primer is first applied to the surfaces, and it is essential that the tile edges be properly primed prior to the application of the elastomeric grouting material. Attempts have been made to spray a priming solution on the tile edges but have met with limited success. Although the sprayed primer reached the tile edge surfaces despite the presence of the projecting sand particles, it was difficult to prevent the spray from overlapping excessively onto the faces of the tile elements. Since, in the manufacture of the pre-grouted tile assemblies, the elastomeric grouting is applied in excess to the aligned tiles and then removed from the tile faces, the application of primer must be restricted to the tile edge surfaces with only a slight overlap along the curved face edges to prevent the grouting from adhering to the tile faces.

In the present invention the preferred method of applying the primer to the tile edges is by bringing the tile edges into contact with a rotating primer applicator roll which is partially immersed in a trough of primer solution.

2

For this method of primer application, the sand particles must be removed from the tile edges.

In view of the above, it is a primary object of the present invention to provide an apparatus for automatically treating the edges of unglazed ceramic mosaic tile elements to remove residual sand particles therefrom.

A further object of the invention is to provide a tile treating apparatus as described which includes means for automatically applying a priming solution to the tile edges following the removal of sand particles therefrom, and means for curing the priming solution.

An additional object of the invention is to provide a tile treating apparatus as described which is adapted to provide a blending of the ceramic tile elements into a random assortment.

Another object of the invention is to provide an apparatus as described which automatically removes double tiles, dust and foreign matter from the tile assortment.

A still further object of the invention is to provide an apparatus as described wherein, following treating of the tile edges, the tiles are automatically distributed in a random assortment into a plurality of rows for transfer to a tile assembly station.

Additional objects and advantages of the invention will be more readily apparent from the following detailed description of an embodiment thereof when taken together with the accompanying drawings in which:

FIGS. 1a and 1b are a divided side elevational view of a tile treating apparatus in accordance with the present invention;

FIG. 2 is a plan view taken along line 2—2 of FIG. 1a showing the tile blending and tile separating units of the apparatus;

FIG. 3 is a schematic view similar to FIG. 2 showing the operation of the tile blending unit;

FIG. 4 is an elevational view partly in section taken along line 4—4 of FIG. 2;

FIG. 5 is a view partly in section taken along line 5—5 of FIG. 2;

FIG. 6 is a view partly in section taken along line 6—6 of FIG. 5;

FIG. 7 is a view partly in section taken along line 7—7 of FIG. 2 showing details of the tile sweep-off brush assembly;

FIG. 8 is a view partly in section taken along line 8—8 of FIG. 2 showing the separator unit;

FIG. 9 is a partial plan view taken along line 9—9 of FIG. 8;

FIG. 10 is a view taken along line 10—10 in FIG. 8;

FIG. 10a is a sectional view taken along line 10a—10a of FIG. 10;

FIG. 11 is a view taken along line 11—11 of FIG. 8;

FIG. 15 is a plan view taken along line 15—15 of FIG. 1a showing the tile erecting fingers and the tile guide conveyor;

FIG. 16 is a view partly in section taken along line 16—16 of FIG. 15;

Figure 12:
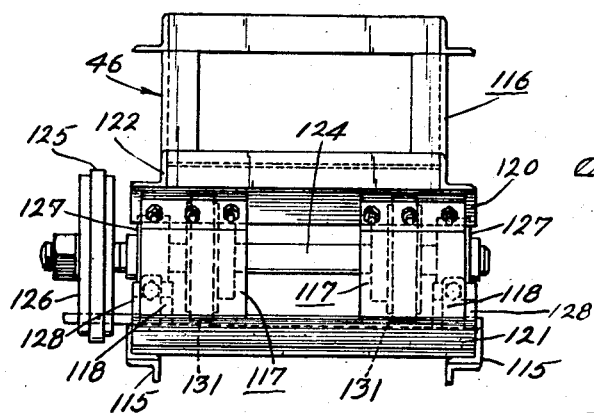
FIG. 12 is a view taken along line 12—12 of FIG. 8.

FIGS. 17, 18 and 19 are successive sectional views taken along lines 17—17, 18—18 and 19—19 of FIG. 16 showing the respective shapes of the tile erecting fingers at those sections and the action of the fingers in erecting tile elements passing therebetween at each successive stage;

FIG. 20 is a view taken along line 20—20 of FIG. 16 showing the passage of a row of tiles from the tile erecting fingers onto the tile guide conveyor;

FIG. 21 is a sectional view taken along line 21—21 of FIG. 15;

FIG. 22 is an enlarged view of the area indicated in FIG. 15;

FIG. 23a is a view taken along line 23a—23a of FIG. 1b;

FIG. 23b is a view taken along line 23b—23b of FIG. 1b;

FIG. 24 is an enlarged view partly in section taken along line 24—24 of FIG. 23a;

FIG. 25 is an enlarged view partly in section taken along line 25—25 of FIG. 24 showing details of one of the tile clamp assemblies;

FIG. 26 is a view taken along line 26—26 of FIG. 25 and showing in broken lines the manner in which the tile clamp assembly opens to receive a tile element FIG. 27 is a view similar to FIG. 25 showing the tile clamp assembly in the open position prior to receiving a tile;

FIG. 28 is a perspective view showing the approach of a tile clamp assembly into the tile receiving position;

FIG. 29 is a view taken along line 29—29 of FIG. 28;

FIG. 30 is a view partly in section taken along line 30—30 of FIG. 24;

FIG. 31 is a view taken along line 31—31 of FIG. 23a showing the passage of the tile clamp assemblies across the tile grinding wheels;

FIG. 32 is a view partly in section taken along line 32—32 of FIG. 31;

FIG. 33 is a view taken along line 33—33 of FIG. 32 showing in broken lines the rotation of a tile element between grinding wheels;

FIG. 34 is a view taken along line 34—34 of FIG. 33;

FIG. 35 is a view taken along line 35—35 of FIG. 32;

FIG. 36 is a view partly in section taken along line 36—36 of FIG. 23b;

FIG. 37 is a view partly in section taken along line 37—37 of FIG. 36 showing the primer applicator rolls and the dryers located therebeneath;

FIG. 38 is a view taken along line 38—38 of FIG. 36 showing details of the primer applicator rolls;

FIG. 39 is an enlarged partial elevational view similar to that of FIG. 36 showing schematically the movement of a tile along a primer applicator roll;

FIG. 40 is a view partly in section taken along line 40—40 of FIG. 1b showing a pair of tile distributor assemblies; and FIG. 41 is a view partly in section taken along line 41—41 of FIG. 40.

The apparatus of the present invention is adapted to receive a batch of ceramic tile elements of various shades and to blend the tiles into a random assortment. The tiles are screened by the apparatus to remove dust and foreign matter and any double tiles are removed by passage of the tiles through narrowly spaced rods. The edges of each tile element are then presented to a grinding or sanding wheel to remove the residual grains of sand therefrom, following which the edges are presented to a primer applicator roll to apply a primer coating to the tile edges. The tiles are subsequently passed through a drying region to dry the primer and are then distributed in a random assortment onto a conveyor leading to a tile tray filling station.

To provide an initial understanding of the embodiment of the invention illustrated, a brief description of the primary features thereof will be presented. Referring to the drawings, and particularly FIGS. 1a, 1b, 2 and 3 thereof, the ceramic tile elements T are introduced into the tile treating apparatus on the belt type tile infeed conveyor 42, the tiles dropping therefrom onto a circular tile blending table 44 upon which they are blended into a random assortment by a group of blending paddles, brushes, and the rotation of the table. The tiles are then transferred from the table by the tile sweep-off brush 45 onto the oscillating separator unit 46 whereon dirt and foreign matter as well as double tiles are separated from the single tiles which are advanced by the oscillating motion of the separator onto the tile guide conveyor 47. Each tile element is removed from the conveyor 47 by a chain-advanced tile clamp assembly 50 and the edges of each tile are successively presented to sanding or grinding wheel assembly 51 to remove the sand grains therefrom. The tiles are further advanced by the tile clamp assemblies 50 through a primer applicator station 52 and under dryers 53 located therebeneath. The treated tiles are then released into the tile distributor assemblies 54 which distribute the tile in a random assortment onto the outfeed conveyor 55 for delivery to a tile assembly station (not shown).

With the above general description of the apparatus in mind, the embodiment will now be considered in detail. With reference to FIGS. 1–7, the tile blending means associated with the horizontal tile blending table 44 includes means for rotating the blending table. As shown in FIG. 4, the table is supported by a plurality of spaced rollers 56 mounted on a suitable supporting frame 57. A central vertical shaft 58 secured at its upper end to the table 44 is journaled by a bearing unit 59 mounted on the frame 57 and at its lower end by a bearing unit 60 mounted on the lower frame 61. The shaft 58 and table 44 are driven slowly in rotation through a large sprocket 62 on the shaft 58 by chain drives connecting the motor 63, speed reducer 64 and the sprocket 62.

The tile elements advanced by the conveyor 42, upon reaching the edge 65 of the conveyor, drop onto the table 44 which is rotated in a counterclockwise direction as indicated in FIG. 3. The tiles are retained on the table surface by the peripheral tile guide 66 attached to the frame 57. During rotation of the table, the tiles are subjected to the stirring action of the three blending paddles 67, 68 and 69, each of which, as indicated in FIGS. 2 and 3, is rotated in a counterclockwise direction. The blending paddles are preferably made of rubber or other resilient material and are continuously rotated in a plane parallel to the table surface by the motor 70 acting through gear reducer 71 and driving the transverse shaft 72 by means of the drive chain and sprocket assembly 73. Suitable transmission units 74 and 75 connected with the shaft 72 drive the respective vertical shafts 76 and 77 to the lower end of which the paddles 69 and 67 are attached. A transmission 78 spaced from the shaft 72 and driven thereby through the drive chain and sprocket assembly 80 rotates the vertical shaft 81 carrying the blending paddle 68. All three of the blending paddles are thus driven continuously by the motor 70 in a counterclockwise direction.

A tile spreading brush 82 comprising helically arranged brush elements 83 on a horizontal shaft 84 is journaled in pillow blocks 85 depending from the frame member 86 to position the brush parallel to the table with the brush elements contacting the table surface as shown in FIG. 5. The spreading brush is disposed diagonally across the table to feed the tile into the paddles and the tile sweep-off brush 45 as illustrated in FIG. 3. A motor 87 and speed reducer 88 mounted on the frame member 86 effect rotation of the brush by means of the chain and sprocket assembly 90.

The sweep-off brush 45, which is similar to the spreading brush 82 although larger in size, includes the helically disposed brush elements 91 secured to the shaft 92 which is journaled by pillow blocks 93 on the brush carriage 94. The sweep-off brush is driven in rotation by a motor 95 mounted on the carriage 94 acting through speed reducer 96 and chain drive 97. The carriage 94 includes the rollers 98 which engage the V-type guide rails 100 on the frame 101 as shown in FIG. 7 to permit horizontal travel of the carriage. As illustrated, the sweep-off brush is radially aligned in parallel contiguous relation with the circular blending table 44 and is of a slightly greater length than the table radius.

As shown in FIG. 2, the guide rails 100 and the supporting frame 101 extend radially outwardly from the blending table across the separator unit 46. Drive means are provided to effect a continuous reciprocation of the sweep-off brush back and forth along the guide rails, the reciprocating and rotating movement of the brush serving to blend the tiles into a random assortment in the inward stroke and to advance the tiles onto the separator unit during the outward stroke in the manner schematically illustrated in FIG. 3. The drive means for effecting the brush reciprocation includes a drive chain 102 disposed between and parallel to the guide rails 100 and connected to the brush carriage 94. The chain 102 at one end passes around idler sprocket 103 on shaft 104 extending between the support plates 105 on the frame 101 and at its opposite end passes over the drive sprocket 106 keyed to drive shaft 107. The drive shaft 107 extends beyond the edge of the blending table 44 and is connected at its outer end by a chain and sprocket assembly 108 to the clutch unit 110 located below the table as shown in FIG. 1a. The clutch unit 110, which is driven by the motor 111 shown in FIG. 2, includes direction reversing means actuated by appropriate limit switches (not shown) in a known manner to reverse the direction of drive of the drive chain 102 when the sweep-off brush carriage 94 reaches its end points of travel. The chain 102 is pinned at 112 to the bracket 113 of the brush carriage to provide a reciprocating drive of the carriage along the guide rails 100.

A batch of tiles is introduced onto the blending table 44 from the conveyor 42 when the sweep-off brush 45 is located at its outermost position 114 shown in broken lines in FIG. 2. As the blending table rotates in a counter-clockwise direction, the tiles are intermixed by the blending paddles 67, 68 and 69 and by the action of the spreading brush 82 while the sweep-off brush 45 is slowly advanced from the outermost position 114 toward the center of the table. The inwardly advancing sweep-off brush is at the same time rotating in a clockwise direction as sectionally viewed in FIG. 7 to provide a further shuffling of the tiles. The brush is preferably advanced at a relatively slow rate on the order of one-half inch per revolution of the blending table. When the sweep-off brush reaches its innermost position shown in FIG. 2, a limit switch is triggered which reverses the clutch unit 110 thus starting the brush in the reverse direction to provide a feeding of the tiles onto the separator unit as shown in FIG. 3. The movement of the brush in this reversed direction can be somewhat faster than its inward travel rate.

The separator unit 46 includes a rigid base frame 15 above which the tile separator assembly 116 is supported by the flexible support units 117 for oscillatory movement. The support units comprise plastic straps 118 bolted to the angles 120 and 121 welded respectively to a frame 122 of the separator assembly and the base frame 115. The angles 120 and 121 are so oriented as to provide an angular disposition of the plastic straps 118 for a purpose which will shortly become evident. The separator assembly 116 is oscillated by an oscillating drive means comprising a motor 123 driving a shaft 124 through the drive belt 125 and sheave 126 keyed to the shaft, the shaft being journaled by pillow blocks 127 adjustably mounted on a support 128 on the base frame 115. Eccentric cams 130 keyed to the shaft 124 coact with the eccentric straps 131 which are pivotally connected by means of crank arms 132 to the downwardly depending angles 133 of the separator frame 122. This drive arrangements provides an oscillation of the entire separator assembly 116 supported on the plastic straps 118, the plastic straps having sufficient flexibility and resilience to permit the desired oscillations of the assembly while providing sufficient support thereto. Because of the angular disposition of the plastic support straps 118, the oscillation of the assembly by the drive means is primarily along a plane normal to the plane of the straps thereby providing a movement of the tiles in the desired direction of travel along the separator unit.

Figure 13:
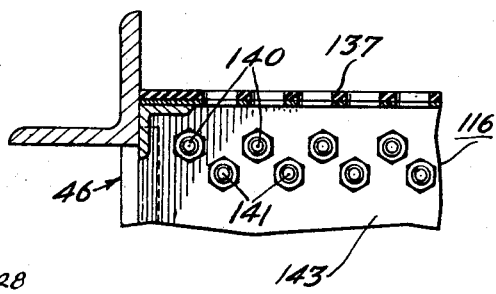
FIG. 13 is a partial sectional view taken along line 13—13 of FIG. 8.

The separator assembly 116 includes a sloping floor 134 attached to the frame 122 which slopes downwardly to an opening 135 located above a collecting bin 136 on the base frame 115. Supported above the floor 134 by suitable framing elements at the left-hand end of the separator assembly 116 as viewed in FIG. 8 is a perforated rubber covered plate 137 shown most clearly in the enlarged view of FIG. 13. The tiles advanced from the blending table 44 by the sweep-off brush 45 fall from the table onto the rubber covered plate 137, the rubber covering of the plate preventing chipping of the tiles on contact therewith. Due to the oscillatory movement of the separator assembly 116, the tiles are advanced on the rubber plate to the right as viewed in FIG. 8 and any dust, tile chips, dirt or other foreign matter passes through the perforations of the plate 137 onto the floor 134 and thence through the opening 135 into the collecting bin 136.

Figure 14:
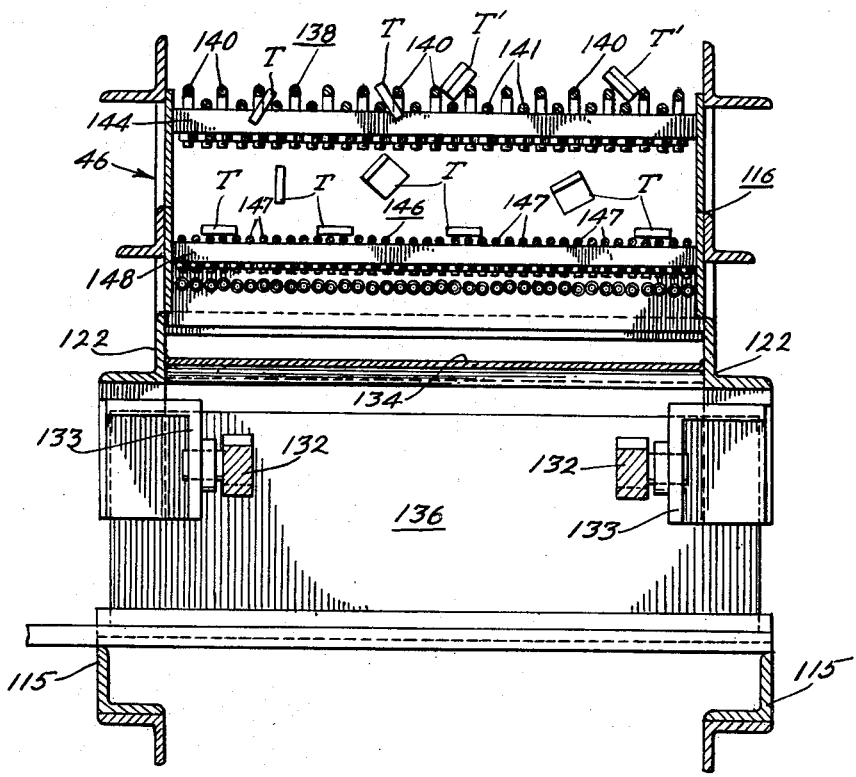
FIG. 14 is a sectional view taken along line 14—14 of FIG. 8 showing the separation of the double tiles from the single tiles.

On reaching the edge of the plate 137, the tiles drop onto the upper separating screen 138 which, as illustrated in FIG. 14, comprises upper and lower rows 140 and 141 of transversely spaced wires, the vertical and horizontal spacing of which is such as to permit the passage therebetween of all single tiles T while any double tiles T' are carried to the end of the upper screen 138 into a double tile discharge trough 142 extending transversely thereacross as shown in FIGS. 2 and 8. The trough 142 is preferably arranged to direct the double tiles into a suitable container (not shown) for which purpose a sloping bottom is provided as illustrated.

The wires 140 and 141 of the upper screen 138 are passed through spaced holes in the transverse partition 143 at the left hand end of the screen as viewed in FIG. 8, being secured thereto by nuts on the threaded end thereof, and are fastened to a transverse plate 144 adjacent the discharge trough 142 at the opposing end thereof in a similar manner. As indicated in FIGS. 10 and 10a, shims 145 are inserted beneath the wires 140 to provide the desired spacing above the wires 141.

The single tiles T, following passage through the upper screen 138, drop onto the lower screen 146 made up of wires 147 extending between the partition 143 and a transverse member 148 in a manner similar to the wires of the upper screen. The wires 147 are of a smaller diameter and spaced closer together to prevent passage of the single tiles therethrough but permitting dirt and dust to drop downwardly onto the floor 134. As shown in FIG. 11, the single tiles are advanced from the lower screen 146 to the right onto a final separating screen 150 nearly identical with the lower screen 146 which provides still another opportunity for foreign matter to disassociate itself from the tiles and drop into the collecting bin 136.

The dust free tiles, on moving from the screen 150, pass onto the plate 151 extending from the separator assembly 116 and connecting the separator unit with the tile guide conveyor. The plate 151, as shown in FIG. 16, overlaps the frame member 152 of the tile guide conveyor 47, a wear plate 153 being attached beneath the plate 151 to move across the surface of the frame member 152 during oscillation of the separator assembly. Mounted on the plate 151 are a plurality of tile erecting fingers 154 aligned parallel with the direction of travel of the tiles and being formed as shown in FIGS. 17–19 in a tapering fashion so as to cause erection of the tiles from a flat condition to an edgewise disposition as shown in FIG. 19. The tile fingers provide a plurality of tile paths which taper from a width sufficient to accommodate a tile in a flat condition to a width only slightly larger than the thickness of the tile. Since the tile fingers are secured to the plate 151, which is part of the separator assembly 116, the tile elements are moved through the tile erecting fingers and erected by the fingers by the oscillating action of the separator assembly. As illustrated, appropriate tile retaining guides are placed around the side edges of the various separating screens and the plate 151 to prevent the escape of tile elements from the desired flow path.

Following erection by the tile erecting fingers, the tiles advance through guide channels 160 on the plate 151 still under the influence of the oscillating separator assembly onto the conveyor belt 161 of the tile guide conveyor 47 as shown in FIGS. 16 and 20. The tile guide conveyor 47 comprises a belt conveyor including the belt 161 which passes around the drive roll 162 on the drive shaft 163 turned by appropriate drive means (not shown). The conveyor belt passes around the idler roll 164 at the opposite end thereof and is tensioned by the idler roll 165 located therebeneath as shown in FIG. 16. Supporting rolls 166 spaced beneath the upper run of the belt, support the tile-carrying run of the belt to form a substantially flat tile-guiding surface. The tiles are channeled along the belt between the tile guides 167 which, as shown in FIG. 15, are arranged in parallel pairs for reasons which will shortly become evident. The tile guides 167 are suspended above the belt 161 from the support members 168 attached to the conveyor frame by the threaded support rods 170 as shown in FIG. 21. As shown in FIG. 20, the tile guides 160 on the plate 151 slidably telescope within flared portions 171 of the aligned guides 167 to accommodate the oscillating movement of the separator assembly to which the guides 160 are attached.

At the tile discharge end of the tile guide conveyor 47, the tiles are directed into tile pickup stations 175 which, as shown most clearly in FIGS. 22, 28 and 29, comprise tile delivery channels 176 connected with the tile guides 167 and extending beyond the end of the conveyor belt 161. Each channel 176 terminates in a tile stop element 177 which successively positions each tile in the pickup position 178 shown in FIG. 28 on a portion 180 of the channel having relatively short channel walls so as to expose the faces of the tile positioned thereon to a tile clamp assembly as described hereinafter. Each tile pickup station includes a channel cover 181 to insure the proper attitude of the tile elements as they enter the portion 180 of the channel, and an upwardly extending tile guide 182 which is arcuately shaped as is the top of the tile stop 175 to guide each tile from the pickup station following pickup by the tile clamp assembly. As each tile is removed from a tile pickup station by a clamp assembly, a new tile is fed into the position 178, the lines of tiles being continuously advanced along the guides 167 into the channels 176 by the conveyor belt 161.

Aligned with the tile guide conveyor 47 is the tile treating unit generally designated 190 which includes spaced parallel frame elements 191 supported by the legs 192. At opposed ends of the treating unit 190 a transverse idler shaft 193 and drive shaft 194 are respectively journaled in the pillow blocks 195 and 196 on the frame elements 191. A plurality of sprockets 197 and 198 are mounted respectively on the shafts 193 and 194 over aligned pairs of which the endless chains 200 are passed. The drive shaft 194 is driven by the motor 201 and speed reducer 202 by means of the chain drive 202 as shown in FIG. 1b.

The chains 200 are arranged in pairs between which the tile clamp assemblies 50 are rotatably supported on transverse shafts 204 as shown in FIGS. 24 and 25. The shafts are attached to the chains by means of the blocks 205 which are pinned to modified links of the chain. Mounted on the shafts 204, which are sapced at intervals along the respective pairs of chains, are the tile clamp assemblies 50, there being, in the present instance, two clamp assemblies attached to each shaft 204. The clamp assemblies are spaced apart a distance equivalent to the spacing of the pairs of tile channels 176 to provide the necessary alignment of the tile clamp assemblies with the tile pickup stations. In the present instance there are three pairs of chains 200 providing six treating lines for treating the tile edges. As will be described hereinafter, the six lines of tiles are increased to twelve by the tile distributor assemblies to provide an outflow of twelve rows of tile elements on the conveyor 55. This arrangement is particularly advantageous for use in filling the standard tile trays holding twelve rows of twenty-four tiles per row. However, for other purposes, it can be understood that the number of treating lines can be increased or deceased as desired.

The tile clamp assemblies 50, as shown for example in FIGS. 27 and 28, each include a bearing block 210 through which one of the shafts 204 passes, the bearing block being journaled on the shaft by means of bearings 211 therein. A rigid tile arm 212 extends from one side of the bearing block 210 while a movable tile arm 213 is pivotally mounted at 214 to the opposite side of the bearing block. A tension spring 215 extending between the clamp arms 212 and 213 urges the clamp arms into the parallel relation shown in FIG. 25. On the outer ends of the clamp arms 212 and 213, the opposed aligned rubber tile clamping tips 216 and 217 are mounted respectively on the shafts 218 and 219 journaled on the clamp arms. The clamping tips, as shown in FIG. 25, are adapted to engage the tile elements in the tile pickup station and, under the tension of the spring 215, to carry the tile elements through the various treating stations of the treating unit.

Mounted on the outer end of the shaft 218 of the rigid clamping arm 212 is the disc 220 having a pair of diametrically spaced outer aligning studs 221 extending from the outer face thereof and four equally spaced aligning studs 222 extending from the inner face thereof. The aligning studs, in conjunction with guide elements to be described hereinafter, serve to rotate the discs 220 and hence the tiles clamped between the clamping tips to present the tile elements to the treating stations in the proper orientation. Mounted on the inner faces of the clamp arms 212 and 213 in opposed relation, as shown most clearly in FIG. 28, are the assembly opening bars 223 which extend upwardly beyond the clamping arms and terminate in inwardly beveled tips. An extender block 224 is mounted on the rear face of each bearing block 210 which, as shown in FIGS. 24 and 27, has an arcuate rear surface 225 adapted to coact with a cylindrical drum 226 extending between the drive sprockets 197, thus locking the tile clamp assemblies in a radial disposition during passage of the assemblies around the drums 226.

As shown in FIG. 24, the tile clamp assemblies are passed through the tile pickup stations during their upward travel around the drums 226 in their radially extended disposition. As the clamp assemblies approach the tile pickup stations, the outer aligning studs 221 of the discs 220 engage curved guides 229 attached to the treating unit frame which serve to rotate the discs into a uniform initial position during the pickup of the tile elements. As each clamp assembly approaches the pickup station, it engages a clamp assembly opening mechanism 230 extending from the treating unit frame on the arm 231. The opening mechanism 230 comprises simply a transverse plate 232 having rollers 233 extending from the corners thereof which are aligned to engage the opening bars 223 on the clamp arms 212 and 213 as illustrated in FIG. 27 to open the assembly by pivoting the movable clamp arm against the force of the spring 215. The beveled tips of the opening bars 223 assist the rollers 233 in entering between the clamp arms and opening the assembly so that the rubber clamp tips 216 and 217 will pass in spaced relation from the faces of a tile element in the tile pickup station. As the clamp assembly clears the opening mechanism, the force of the spring 215 springs the clamping tips together against the faces of the tile element to grasp the tile element and lift it from the pickup station as shown in FIGS. 24 and 25. FIG. 26 shows in broken lines at 234 the position of the open assembly and in solid lines the position of the assembly just after passage over the opening mechanism.

As shown in FIG. 24, the tile bearing clamp assemblies on passing over the top of the drum 226 in the erect position engage the knock down plates 240 suspended from the frame assembly 241 bridged across the tile treating lines. The plates 240 contact the discs 220 of the clamp assemblies and pivot the assemblies into the inclined position 242 shown in FIG. 24 with the outer guide studs 221 engaging a disc guide 243 suspended by the arms 244 from the frame assembly 241. As shown in FIGS. 24 and 30, the chains 200 are supported along the upper runs thereof by the horizontal chain guides 245, and the angular disposition of the tile clamp assemblies is determined by a series of guide elements.

The tile clamp assemblies in advancing from the position 242 drop from the end of the guides 243 onto the disc guides 246 which slope downwardly as indicated in FIG. 24. With the discs 220 engaging the disc guides 246, the clamp assemblies pivot downwardly about the shafts 204 until the outer studs 221 contact the aligning guides 247, supporting the assemblies in the position 248 shown in FIG. 24.

On further advancement, due to the inclined end portions 249 of the aligning guides 247, the assemblies drop into the position 250 whereupon a first edge of each tile element engages the face of a first grinding wheel 251 having the cylindrical shape illustrated and which is rotatably mounted on a shaft 252 aligned with the path of travel of the tile elements. Mounted on each shaft 252 in addition to the first grinding wheel 251 are the second, third and fourth grinding wheels 253, 254 and 255, which are adapted to successively engage the several edges of the tile elements in a manner to be presently described. The shafts 252 are journaled, as shown in FIG. 1b, at their ends by the respective bearings 256 and 257 mounted on frame members 258 and 259 extending transversely between the frame elements 191. The shafts 252 are driven from a transverse drive shaft 260 mounted in bearings 261 on the frame elements 191 by means of the miter gears 262, adjoining pairs of shafts 252 being rotatably connected by gears 263 as shown in FIG. 23b. The drive shaft 261 is connected to a suitable power source (not shown) and is driven in continuous rotation.

During passage of the tile-bearing clamp assemblies across the grinding wheels, the weight of the assemblies is borne by the tiles and serves to bias the tile edges against the wheels, the wheels removing the sand particles from the tile edges and providing a smooth edge surface which may be subsequently sealed with a primer solution in a manner to be presently described. A disc support rail 265 is provided aligned with the clamp assembly discs but spaced slightly therebelow during treatment of the tiles. The rails 265 which, as shown in FIG. 32, are supported by arms 266 depending from chain guides 245, are provided to support the tile assemblies in the event that the assemblies are run across the grinding wheels without tile elements, thereby avoiding damage to the assemblies through contact with the grinding wheels.

The clamped tile elements are rotated 90° between contact with each successive grinding wheel by the action of turning camps 267 which are located in the path of the inner disc guide studs 222 as shown in FIG. 32-35. As shown in FIG. 35, as the disc approaches the cam 267, neither the disc nor the inner or outer guide studs are engaged with a guide surface, the rotational position of the disc being determined solely by the engagement of the clamped tile element with the grinding wheel. However, as illustrated in FIG. 33, as the disc passes over the cam 267, the cam, due to its curved upper cam surface 268, engages the inner guide studs 222 to rotate the disc and clamped tile through 90° while raising the assembly sufficiently above the grinding wheels to provide clearance of the tile during the rotation thereof to prevent tile contact with the grinding wheel edges. Since the tiles are rotated 90° by each of the three cams 267, all four edges of the tile elements are successively engaged with the grinding wheels to effect a uniform treatment of each of the tile edges.

Following passage of the tile-bearing clamp assemblies, across the last grinding wheel 255, the outer guide studs are engaged by the guide rails 270 as shown in FIG. 23b to support the assemblies as they pass into the primer applicator station 52. In the primer applicator station, a plurality of primer applicator rolls 271 aligned with the tile flow are mounted for rotation in a primer solution. As shown in FIG. 37, a plate 272 extending between the treating unit frame members supports therebeneath a primer sump 273 containing a primer solution 274, the plate 271 including apertures 275 connecting the sump 273 with a plurality of primer troughs 276 within which the primer applicator rolls 271 are rotatably mounted. The sump 273 is supplied with primer solution from a suitable source (not shown) and maintains a uniform primer level in each of the communicating troughs. Draining of the troughs and sump is easily accomplished by means of the single drainpipe 277 shown in FIG. 36.

Flexible primer spreading blades 279 are spring biased against the applicator rolls 271 to insure a uniform application of primer to the rolls. The applicator rolls, as shown in FIG. 38, each comprise a cylindrical roll element 280 which is inserted onto a drive shaft 281 at one end of a trough 276 and is rotatably mounted at the other end by means of the telescoping spring-biased center pin 282 adapted for coaction with conical slot of the bearing plate 283. The cylindrical roll element 280 may be readily removed by depression of the center pin 282 to telescope it against the spring pressure into the roll, permitting removal of the roll from the bath. The shafts 281 are journaled by suitable bearings 285 and are driven continuously in rotation by the series of chain drive assemblies 286 from the main drive shaft 287 connected with a suitable power source (not shown).

The tile carrying clamp assemblies, upon reaching the primer applicator station, drop from the guide rail 270 onto the cam surfaced guides 290 aligned to engage the inner guide studs 222. Each of the guides 290 include a series of cams 291 having a shape similar to the cams 267 previously described and which serve to rotate the tile elements three times through 90° to provide contact of each tile edge with the primer applicator roll 271. The action of the cam surfaces is shown in the schematic view of FIG. 39 wherein it is shown that the flats 292 of the guides lie below the cam surfaces lie below the inner guide studs 222 during engagement of the tile edges with the applicator rolls to insure contact of all the edges with the rotating roll and a uniform application of primer thereto. Similarly, it is shown in FIG. 39 that the cam surfaces lift the clamp assemblies to a sufficient height during rotation of the tiles so that the tile corners clear the applicator rolls to avoid damage to the tile edges.

Following passage across the primer applicator rolls, the clamp assemblies are pivoted upwardly by means of the aligned guides 294 as shown in FIG. 36 which engage the inner guide studs 222. As shown in FIG. 23b, the clamp assemblies are subsequently supported by the guide rails 295 which contact and provide rotation of the discs and hence the tile elements to initiate drying of the primer on the tile edges.

Following passage of the clamp assemblies around the shaft 194 at the end of the treating unit, the tiles are presented to the dryers 53 as illustrated in FIG. 37. The dryers comprise rectangular ducts 300 into which hot air is supplied from a suitable source (not shown) and from which the hot air is directed downwardly through apertures 301 onto the tile elements passing therebeneath. Disc guides 302 are provided in the dryer region upon which the discs 220 ride to support the clamp assemblies and provide a rotation of the tile elements during passage through the dryer region to effect a uniform exposure of the primer treated tile edges to the downwardly directed drying air.

Following passage through the dryers, the clamp assemblies drop from the disc guides 302 into the vertical position 303 shown in FIG. 24. The arcuate rear surfaces 224 of the clamp assemblies shortly thereafter contact the drum 226 to lock the assemblies in a radial disposition during passage around the drum. As the clamp assemblies start around the drum, the outer guide studs 221 engage the curved guide 229 previously described. The assemblies then advance into the tile release mechanism 304 which includes the supporting arm 305 connected to a suitable frame member, a transverse plate 306 secured at the end thereof, and the rollers 307 spaced at the corners of the plate 306 to cooperate with the opening bars 223 on the clamp arms 212 and 213 to effect an opening of the clamp assemblies and a release of the tile elements.

The tiles, upon release from the clamp assemblies, drop downwardly into the upwardly opening vertical chutes 310 of the tile distributor assemblies 54 as shown in FIGS. 24 and 40. The chutes 310 each includes a central partition 311 extending from beneath a pivotally mounted diverter plate 312 to the lower end of the chute. The blade shaped diverter plates are mounted on the shafts 313 extending through the chutes 310 as shown in FIG. 41. The shafts 313 are connected to a linkage arrangement which effects a flip-flop action of the diverter plates from a first position 314 shown in broken lines in FIG. 40 to a second position 315, by means of which the tiles are diverted into one or the other of the two passages formed by the divider 311. The chutes 310 are lined with a plastic liner 316 and the divider 311 similarly is provided with a plastic liner 317 to minimize the possibility of scratching the tiles as they drop through the chutes. The tile elements drop from the chutes onto the belt conveyor 55, being aligned thereon in rows by the tile guide 318 as shown in FIG. 40.

The linkage which provides the flip-flop action of the diverter plates 312 includes crank arms 320 attached to the shafts 313 and which are pivotally connected at their lower ends to the transverse connecting rod 321. Each end of the connecting rod 321 is pivotally attached to the spaced pivot arms 322 and 323 which are respectively pivoted about the pivot shafts 324 and 325. The pivot arm 322 is urged in rotation in a clockwise direction as viewed in FIG. 40 by the tension spring 326 extending between the upper end thereof and a frame member. A horizontal cam follower rod 330 slidably mounted in the rod guide 331 includes rollers 332 and 333 at the opposite ends thereof which are respectively engaged with the upper end of the pivot arm 323 and a cam 334 mounted on camshaft 335 driven by a suitable power source (not shown).

The spring 326, acting on the pivot arm 233, by means of the connecting rod 321, serves to maintain the pivot arm 323 in engagement with the cam follower rod and the rod in turn in engagement with the cam 334. The movement of the cam upon rotation of the camshaft 335 moves the crank arms 320 back and forth to cause the desired flip-flop action of the diverter plates 312. The camshaft is preferably driven at such a speed as to cause a change of the diverter plate position after each tile has dropped from the tile clamp assemblies so that consecutive tiles will be diverted into adjoining channels of the chute and hence into adjacent tile lines on the conveyor 55. It can thus be understood that by means of the tile distributor assemblies, the random arrangement of the tiles provided by the tile blending table can be maintained even though the number of rows of tiles are increased in the present instance from six to twelve. The conveyor 55 is adapted to advance the rows of tiles directly to a tile tray filling apparatus and the illustrated apparatus is particularly adapted for filling the standard tile trays accommodating twelve rows of twenty-four tiles each.

The operation of the device, which has been presented in considerable detail in the above description of the apparatus, considered in summary form involves the feeding on the conveyor 42 of a batch of tile onto the tile blending table 44. The tiles are fed onto the blending table when the sweep-off brush 45 is in the outermost position 114. As the table is slowly rotated, the paddles 67, 68 and 69 are continuously rotated to stir the tiles and the sweep-off brush is slowly advanced toward the center of the table. The continual rotation of the spreading brush 82 and the sweep-off brush in conjunction with the rotation of the paddles and the table serves to blend the tiles into a random assortment. When the sweep-off brush reaches the innermost position illustrated in FIG. 2, the clutch assembly is actuated to reverse the direction of transverse travel of the brush and its slow outward movement advances the tiles onto the oscillating separator assembly as illustrated in FIG. 3. Dust and foreign matter pass through the perforated rubber coated screen 137 and the tiles are advanced onto the upper screen 138 through which the single tiles drop onto the lower screen 146. The single tiles are then advanced across the screen 150 into the tile erecting fingers 154 from which they emerge in an endwise disposition and pass onto the tile guide conveyor 47.

The tiles pass along the tile guide conveyor into the tile pickup stations whereupon the tile clamp assemblies in the manner described above pick up the tiles and present the edges thereof successively to the tile grinding wheels 251–255. Each of the tile edges is then presented to the primer applicator rolls and a uniform coating of primer is applied to each of the dressed tile edges. The primer is then dried during the passage of the tiles beneath the dryers 53 and the tile elements are subsequently dropped into the tile distributor assemblies for distribution onto the conveyor 55 without destroying the random arrangement of the tiles.

The operation of the apparatus is wholly automatic and requires a minimum amount of attention during operation. The sand particles are thoroughly removed from the edges of the tile elements and a uniform primer coat applied thereto to insure a complete adherence of the elastomeric grouting thereto during formation of the pregrouted tile assemblies.

We claim:

1. Tile treating apparatus for removing said particles from the edges of ceramic tile elements and applying a primer solution to the tile edges comprising a plurality of grinding wheels, means for driving said grinding wheels in rotation, means for successively presenting the several edges of a tile element to said grinding wheels to remove the sand particles therefrom, said means for presenting the tile edges to said grinding wheels comprising at least one tile clamp assembly, and means adapted to advance said tile clamp assembly across said grinding wheels including means for rotating the tile element clamped in said tile clamp assembly to successively present the tile element edges to said grinding wheels, and means for applying a primer solution to the tile element edges following removal of the sand particles therefrom.

2. The invention as claimed in claim 1 including means for curing the primer solution.

3. Tile treating apparatus for removing sand particles from the edges of ceramic tile elements and applying a primer solution to the tile edges comprising a frame, a pair of spaced parallel shafts journaled on said frame, a pair of spaced sprockets on each of said shafts, a pair of endless chains extending around said sprockets, drive means for driving one of said shafts in rotation to advance said chains at a uniform rate, a plurality of tile clamp assemblies pivotally mounted between said chains, a plurality of grinding wheels rotatably disposed between said chains on said frame, means for driving said grinding wheels in rotation, means on each of said tile clamp assemblies for carrying a tile element across said grinding wheels including means for rotating the tile elements clamped in said tile clamp assemblies to successively present the several edges thereof to said grinding wheels, and means for applying a primer solution to the edges of the tile elements following removal of the sand particles therefrom.

4. The invention as claimed in claim 3 wherein said means for applying a primer solution to the edges of the tile elements comprises a primer applicator roll rotatably mounted between said chains, means for presenting each edge of the tile elements successively to said applicator roll, means for continuously driving said applicator roll in rotation, and means for applying a primer solution in a uniform manner to said primer applicator roll.

5. The invention as claimed in claim 4 wherein said means for applying a primer solution to said applicator roll comprises a trough within which said applicator roll is mounted, said trough being adapted to contain a primer solution so that said applicator roll is partially immersed in said solution.

6. The invention as claimed in claim 5 including drying means located between said chains for curing the primer solution applied to the tile edges.

7. Apparatus for applying a primer solution to the edges of ceramic tile elements comprising a trough adapted to contain a primer solution, a primer applicator roll rotatably mounted in said trough and adapted for partial immersion in the primer solution, means for continuously driving said applicator roll in rotation, means for advancing tile elements axially along said applicator roll with the tile edges in axially aligned engagement with said roll, and means for rotating the tile elements during advancement thereof along said roll to successively move said tile elements toward and away from said roll thereby successively presenting the edges of the tile elements to the unimmersed portion of said applicator roll whereby a uniform coating of primer solution is applied to the tile edges.

8. Apparatus as claimed in claim 7 wherein said means for advancing tile elements axially along said applicator roll comprises a pair of spaced parallel endless chains in parallel alignment with the axis of said roll, means for advancing said chains at a uniform rate, and a plurality of tile clamp assemblies pivotally mounted between said chains, each clamp assembly being adapted to present a tile clamped therein to said roll upon advancement of said chains.

9. Apparatus as claimed in claim 8 wherein said means for rotating the tile elements comprises opposed rotatable tile clamping tips on each said tile calmp assembly, aligning studs associated with said tips, and cam surfaced guides mounted adjacent said roll and parallel thereto for engagement by said studs, said engagement producing a rotation of the tile elements to present each edge thereof to the applicator roll.

References Cited
UNITED STATES PATENTS

| | | | |
|---|---|---|---|
| 729,512 | 5/1903 | Sejnoha et al. | 118—72 |
| 2,263,131 | 11/1941 | Hoza | 118—72 |
| 2,339,952 | 1/1944 | Schleicher | 118—72 |
| 2,709,864 | 6/1955 | Gulbrandsen | 29—211 |

WALTER A. SCHEEL, Primary Examiner

ROBERT I. SMITH, Assistant Examiner

U.S. Cl. X.R.

29—211